(12) United States Patent
Daeef

(10) Patent No.: US 9,183,708 B2
(45) Date of Patent: Nov. 10, 2015

(54) MULTISENSOR SYSTEM FOR THE BLIND

(71) Applicant: UMM AL-QURA UNIVERSITY, Makkah (SA)

(72) Inventor: Salha Fahad Daeef, Makkah (SA)

(73) Assignee: UMM AL-QURA UNIVERSITY, Makkah (SA)

( * ) Notice: Subject to any disclaimer, the term of this patent is extended or adjusted under 35 U.S.C. 154(b) by 71 days.

(21) Appl. No.: 14/197,965

(22) Filed: Mar. 5, 2014

(65) Prior Publication Data
US 2015/0254943 A1 Sep. 10, 2015

(51) Int. Cl.
| | |
|---|---|
| G08B 1/08 | (2006.01) |
| G08B 3/10 | (2006.01) |
| A43B 3/00 | (2006.01) |
| A41D 20/00 | (2006.01) |
| G01S 15/93 | (2006.01) |
| A61H 3/06 | (2006.01) |
| G01S 17/93 | (2006.01) |

(52) U.S. Cl.
CPC *G08B 3/10* (2013.01); *A41D 20/00* (2013.01); *A43B 3/0005* (2013.01); *A43B 3/0021* (2013.01); *A61H 3/061* (2013.01); *A61H 3/068* (2013.01); *G01S 15/93* (2013.01); *G01S 17/93* (2013.01)

(58) Field of Classification Search
CPC ..... A61H 3/061; A61H 3/068; A43B 3/0005; H04R 5/033; G01S 17/93; G01S 15/93

USPC ......... 340/539.11; 135/911; 342/24; 367/116
See application file for complete search history.

(56) References Cited

U.S. PATENT DOCUMENTS

| | | | | |
|---|---|---|---|---|
| 4,280,204 | A * | 7/1981 | Elchinger | 367/116 |
| 5,687,136 | A * | 11/1997 | Borenstein | 367/116 |
| 5,724,313 | A * | 3/1998 | Burgess et al. | 367/116 |
| 7,706,212 | B1 * | 4/2010 | Campbell | 367/116 |
| 8,077,020 | B2 * | 12/2011 | Behm et al. | 135/911 |
| 9,024,874 | B2 * | 5/2015 | Stetten et al. | 345/158 |
| 2003/0184441 | A1 | 10/2003 | Nanayakkara et al. | |
| 2011/0316694 | A1 | 12/2011 | Hong et al. | |
| 2012/0119920 | A1 | 5/2012 | Sallop et al. | |
| 2014/0266570 | A1 * | 9/2014 | Sharma et al. | 340/4.12 |

FOREIGN PATENT DOCUMENTS

| | | |
|---|---|---|
| CN | 202445272 U | 9/2012 |
| MX | 2009001705 A | 8/2010 |

* cited by examiner

*Primary Examiner* — John A Tweel, Jr.
(74) *Attorney, Agent, or Firm* — Richard C. Litman

(57) ABSTRACT

The multisensor system for the blind includes a cane, a boot, a headband, and a central control device. The cane, the boot, and the headband may each include one or more sensors to detect obstructions in the path of the user. Each sensor may be configured to detect obstructions at a level corresponding generally to an elevation at which it is carried on the user. Once an obstruction is detected, the sensors may transmit signals to the central control device. The central control device may process the signals and activate an appropriate auditory device to alert the user of the presence and/or distance of the obstruction.

10 Claims, 5 Drawing Sheets

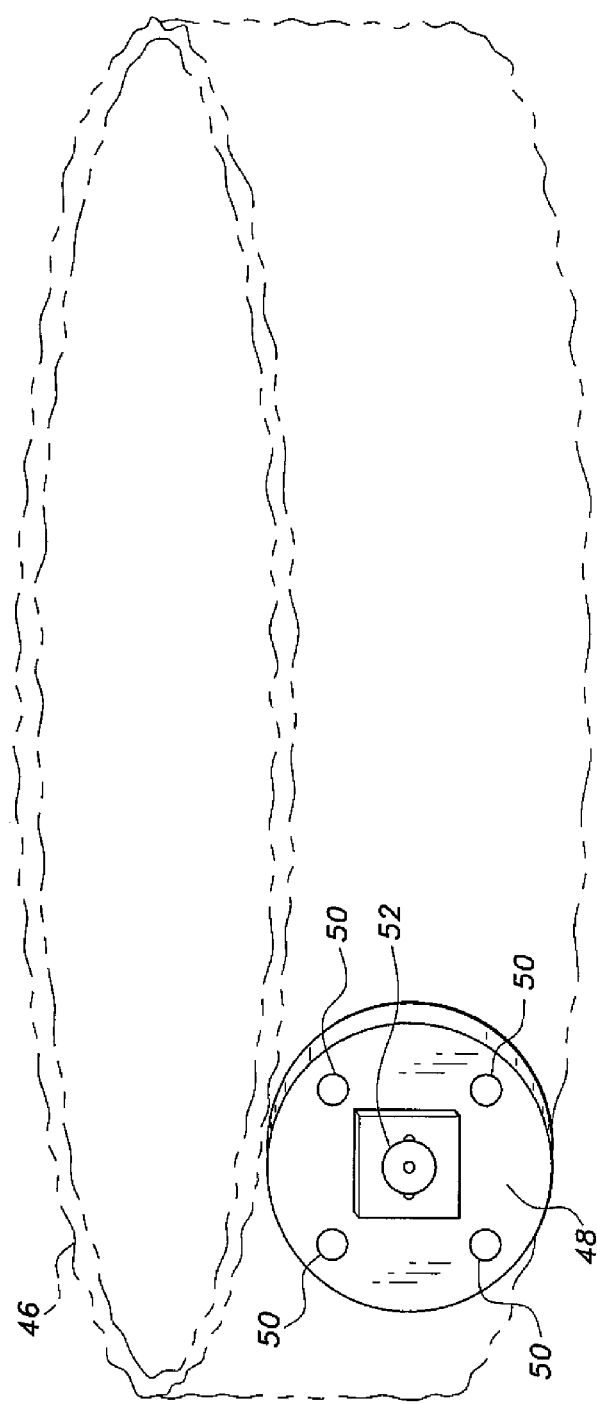
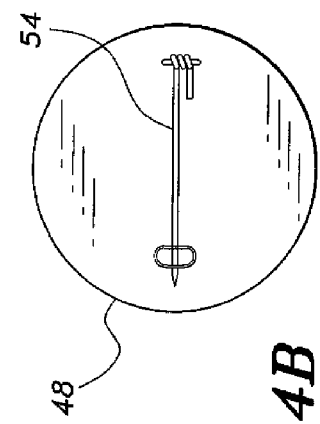
Fig. 4A
Fig. 4B

MULTISENSOR SYSTEM FOR THE BLIND

BACKGROUND OF THE INVENTION

1. Field of the Invention

The present invention relates to systems for aiding the visually impaired, and particularly to a multisensor system for the blind.

2. Description of the Related Art

Visually impaired people typically employ accessories, such as canes, to detect nearby objects or hindrances. Generally, however, conventional canes fail to prepare the user for obstructions in the user's path that are further away than the length of the cane. As such, the user may not have sufficient time to determine an alternate path. Also, canes generally inform the user of obstructions disposed below waist-level, such as curbs, stones and objects that extend vertically from the ground. However, because canes have a distal end that travels at ground level, they cannot detect obstacles suspended above the ground, such as structural overhangs and low-hanging branches.

Thus, a multisensor system for the blind solving the aforementioned problems is desired.

SUMMARY OF THE INVENTION

The multisensor system for the blind includes a cane, a boot, a headband, and a central control device. The cane, the boot, and the headband may each include one or more sensors to detect obstructions in the path of the user. Each sensor may be configured to detect obstructions at a level corresponding generally to an elevation at which it is carried on the user. Once an obstruction is detected, the sensors may transmit signals to the central control device. The central control device may process the signals and activate an appropriate auditory device to alert the user of the presence and/or distance of the obstruction.

These and other features of the present invention will become readily apparent upon further review of the following specification and drawings.

BRIEF DESCRIPTION OF THE DRAWINGS

FIG. 4A is a partial perspective view of a headband with detachable headband pin or turban pin in a multisensor system for the blind according to the present invention.

FIG. 4B is a rear view of the headband pin or turban pin of FIG. 4A.

Similar reference characters denote corresponding features consistently throughout the attached drawings.

DETAILED DESCRIPTION OF THE PREFERRED EMBODIMENTS

The multisensor system for the blind includes multiple accessories for assisting the blind and a central control device that is configured to receive electronic signals from the multiple accessories. The accessories may be worn or carried by the user to assist the user to perform routine activities independently. Each accessory may include one or more sensors to detect obstructions in the path of the user. Each accessory may be worn or carried at different elevations with respect to the user's body, and each sensor may be configured to detect obstructions at a level corresponding generally to an elevation at which the respective accessory is worn or carried. Once an obstruction is detected, the sensors may transmit signals to the central control device. The central control device may process the signals and activate an appropriate auditory device to alert the user of the presence and/or distance of the obstruction.

The accessories of the multisensor system may include a cane, a boot, and a headband. The sensors carried by the accessories of the multi-sensor system may be any type of sensor suitable for detecting nearby objects or obstructions. Preferably, the sensors are ultrasonic sensors, such as ultrasonic nano-sensors. The sensors may be capable of detecting objects or obstructions in the path of the user and transmitting electronic signals received to an appropriate device so that the user may be informed of the presence and/or distance of the object or obstruction. The signals may be analog or digital. The information transmitted by the sensors may be processed and ultimately transmitted to the user, as shown in FIG. 1.

Figure 1:
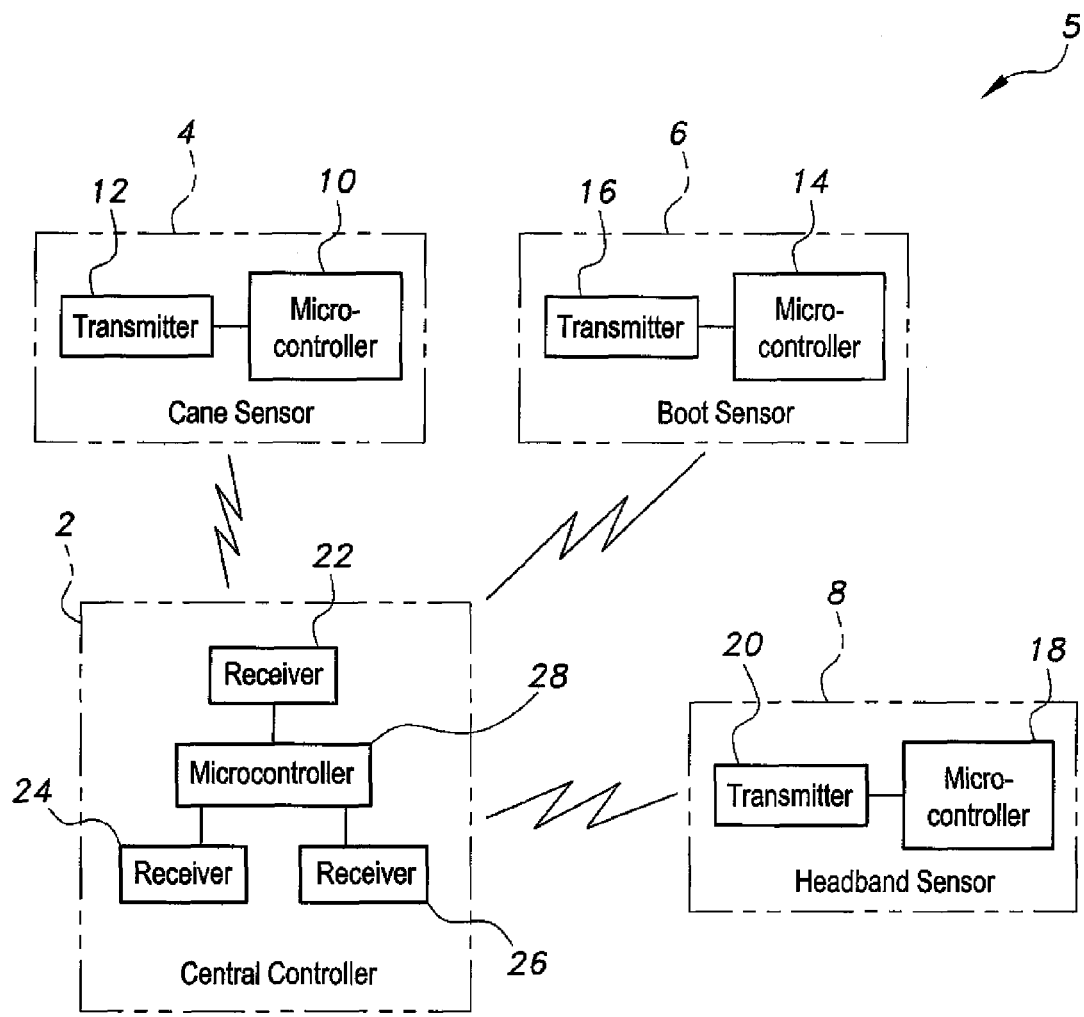
FIG. 1 is a block diagram showing components of a multisensor system for the blind according to the present invention.

The multisensor system for the blind, the system being designated generally as 5 in the drawing, may include a central control device 2, a cane sensor 4 carried by the cane, a boot sensor 6 carried by the boot, and a headband sensor 8 carried by the headband, as shown in FIG. 1. The cane sensor 4, the boot sensor 6, and the headband sensor 8 may be ultrasonic sensors. The central control device 2 may periodically, e.g., hourly, prompt the cane sensor 4, the boot sensor 6, and the headband sensor 8 to send sound waves.

The cane sensor 4 may include a microcontroller 10 and a transmitter 12. Once prompted by the central control device 2, the cane sensor 4 sends sound waves outward from the face of the sensor 4 and receives echoes of the waves reflected off of an object. The object may be at an elevation corresponding generally to the elevation of the cane sensor 4. Once the reflected echo is received, the microcontroller 10 of the cane sensor 4 may calculate the distance of the object and the transmitter 12 may transmit an electrical signal to be interpreted by the central control device 2.

The boot sensor 6 may also include a microcontroller 14 and a transmitter 16. Once prompted by the central control device 2, the boot sensor 6 sends sound waves outward from the face of the sensor 6 and receives echoes of the waves reflected off of an object. The object may be at an elevation corresponding generally to the elevation of the boot sensor 6. Once the reflected echo is received, the microcontroller 14 of the boot sensor 6 calculates the distance of the object and the transmitter transmits an electrical signal to be interpreted by the central control device 2.

The headband sensor 8 may also include a microcontroller 18 and a transmitter 20. Once prompted by the central control device 2, the headband sensor 8 sends sound waves outward from the face of the sensor 8 and receives echoes of the waves reflected off of an object. The object may be at an elevation corresponding generally to the elevation of the headband sensor 8. Once the reflected echo is received, the microcontroller 18 of the headband sensor 8 calculates the distance of the object and the transmitter 20 transmits an electrical signal to be interpreted by the central control device 2.

The central control device 2 may include a first receiver 22, a second receiver 24, a third receiver 26, and a microcontroller 28. The first receiver 22 may be configured to receive signals only from the cane sensor 4. The second receiver 24 may be configured to receive signals only from the boot sensor 6. The third receiver 26 may be configured to receive signals only from the headband sensor 8. Once the signals are received from the first receiver 22, the second receiver 24, and the third receiver 26, they are interpreted and processed by the microcontroller 28. The microcontroller 28 may then activate appropriate auditory devices to alert the user of the presence and/or proximity of the object. The central control device 2, the cane, the boot, and the headband may each include an auditory device, as discussed in detail below. Each auditory device may emit a beeping sound or speech output to indicate the presence and/or distance of the object. The central control device 2 may be further configured to include a Global Positioning System (GPS) tracking device with Braille interface. The tracking device may help the user locate the cane, the boot, and/or the sensor if one or all of the accessories are misplaced.

Figure 2:
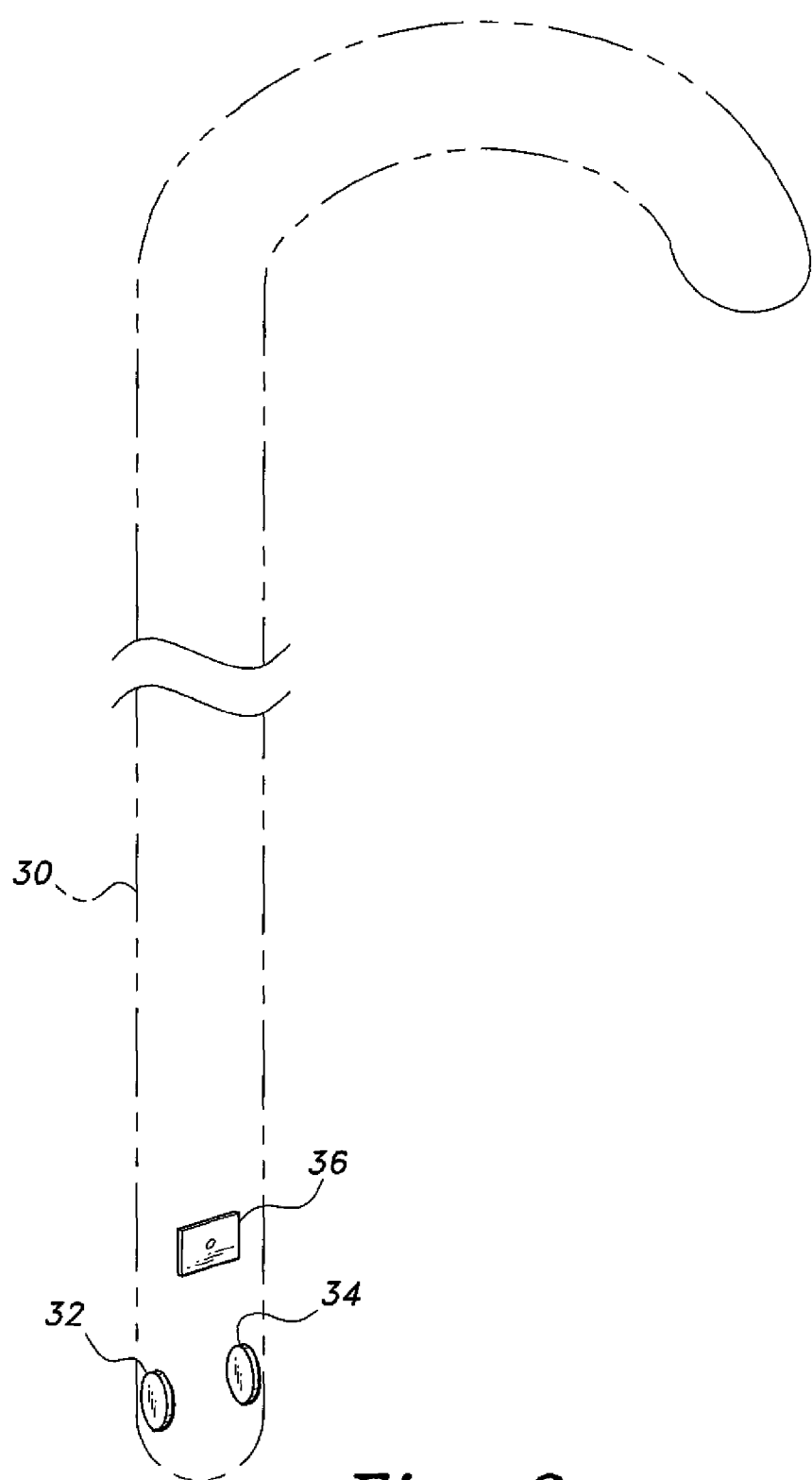
FIG. 2 is a partial perspective view of a cane in a multisensor system for the blind according to the present invention.
Figure 5:
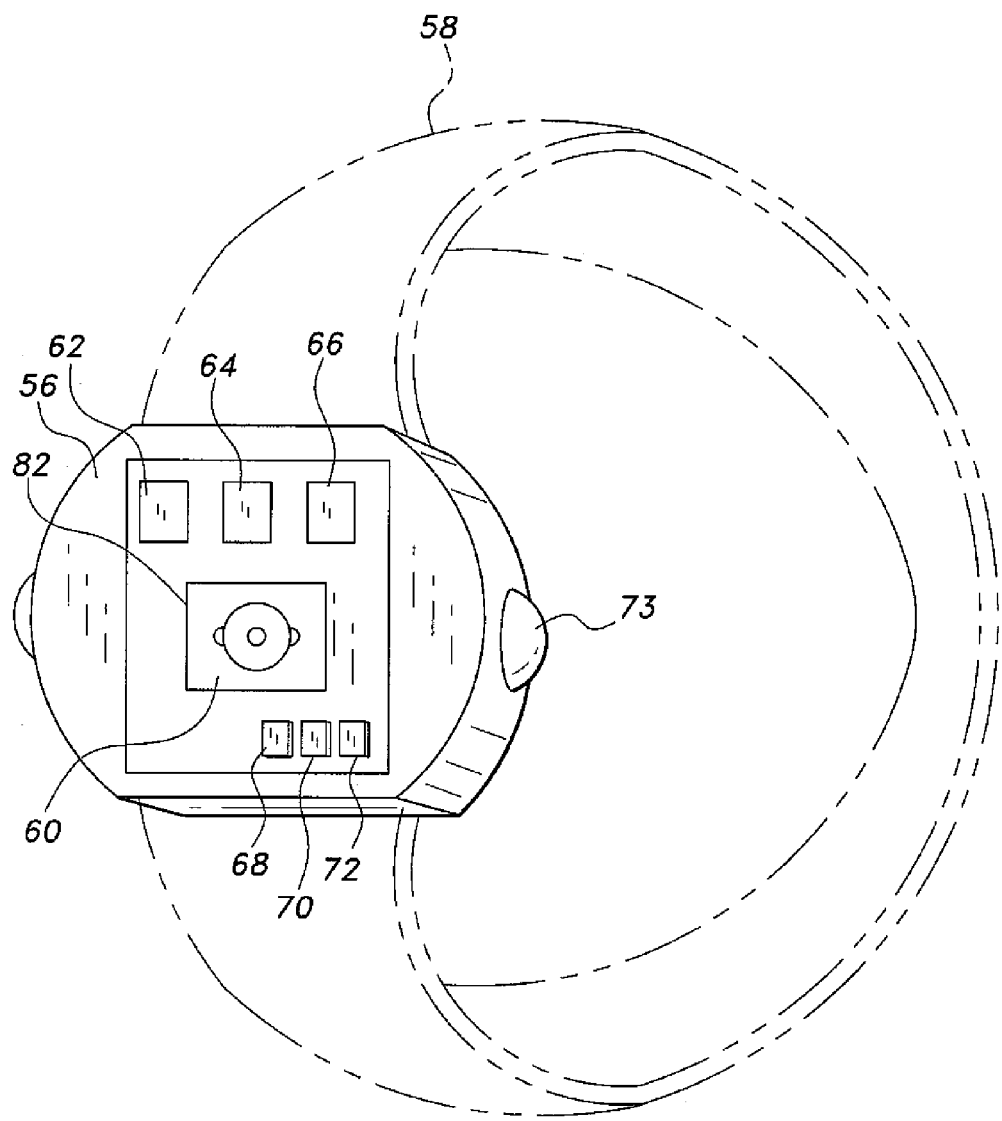
FIG. 5 is a perspective of a wristband controller of a multisensor system for the blind according to the present invention.

FIG. 2 depicts an exemplary cane 30 of the multisensor system for the blind 5. The cane 30 may include a front sensor 32, a rear sensor 34, and an auditory device 36. The front sensor 32 and the rear sensor 34 may be ultrasonic nano-sensors, as discussed above. The front sensor 32 of the cane 30 may detect obstructions in front of the cane 30, generally at about ground level. The rear sensor 34 of the cane 30 may detect obstructions behind the cane 30, generally at about ground level. Once obstructions are detected, the front sensor 32 or the rear sensor 34 may transmit signals to the central control device 2, which may be housed on a wristband 58 (FIG. 5). The central control device/wristband 58 may process the signals received and transmit an auditory signal to activate the auditory device 36. Both the auditory device 36 of the cane 30 and an auditory device 62 of the central control device/wristband 58 (FIG. 5) may be activated. Once activated, the auditory devices 36 and 62 may emit a beeping sound or speech output to indicate the presence and/or distance of the obstruction. The cane 30 may be made from any suitable material, including, for example, stainless steel, plastic, or wood. The cane 30 may include a leather handgrip.

Figure 3:
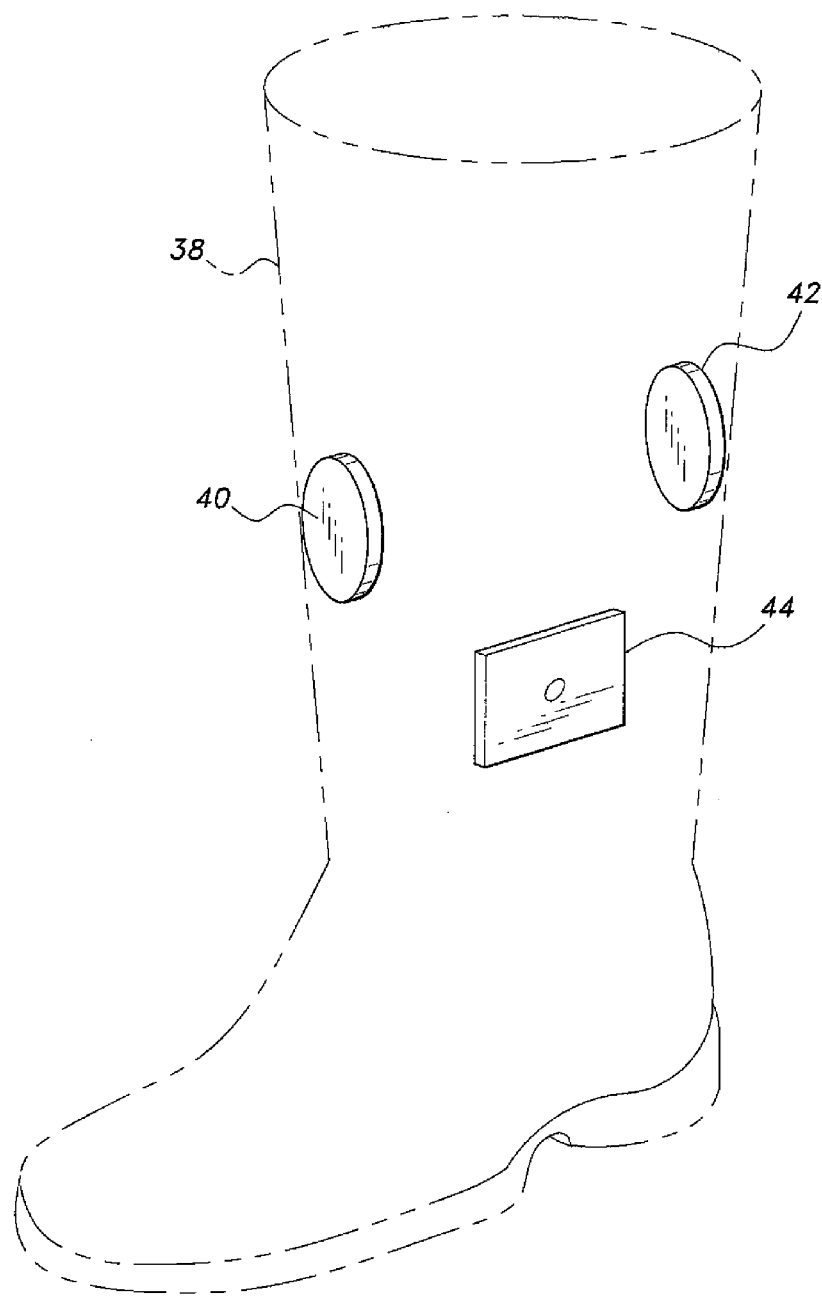
FIG. 3 is a perspective view of a boot in a multisensor system for the blind according to the present invention.

FIG. 3 depicts an exemplary boot 38 of the multisensor system for the blind. The boot 38 may include a front sensor 40, a rear sensor 42, and an auditory device 44. The front sensor 40 and the rear sensor 42 may be ultrasonic nano-sensors, as discussed above. Although not shown, additional sensors may be provided on the boot, e.g., at various elevations on the sides of the boot 38. The front sensor 40 of the boot 38 may detect obstructions in front of the boot 38, generally at about shin level. The rear sensor 42 of the boot 38 may detect obstructions behind the boot 38, generally at about shin level. Once obstructions are detected, the front sensor 40 or the rear sensor 42 may transmit signals to the central control device/wristband 58 (FIG. 5). An auditory signal may be emitted from the central control device/wristband 58 to activate the auditory device 44. Both the auditory device 44 of the boot 38 and the auditory device 62 of the central control device/wristband 58 (FIG. 5) may be activated. Once activated, the auditory devices 44 and 62 may emit a beeping sound or speech output to indicate the presence and/or distance of the obstruction. The boot 38 may be made from any suitable material, such as leather, rubber, or plastic.

FIG. 4A depicts an exemplary headband 46 of the multisensor system for the blind. The headband 46 includes a detachable pin 48, such as a headband pin or turban pin, secured to an exterior of the headband 46. The detachable pin 48 is used to house or mount a plurality of sensors 50 and an auditory device 52. The plurality of sensors 50 may be ultrasonic nano-sensors, as discussed above, for detecting obstructions generally at about head level of the user. Once obstructions are detected, the plurality of sensors may transmit signals to the central control device/wristband 58 (FIG. 5). An auditory signal may be emitted from the central control device/wristband 58 to activate the auditory device 52. Both the auditory device 52 of the headband 46 and the auditory device 82 of the central control device/wristband 58 (FIG. 5) may be activated. Once activated, the auditory devices 52 and 82 may emit a beeping sound or speech output to indicate the presence and/or distance of the obstruction.

The detachable pin 48 may include a pin assembly 54 having a clasp and pivotally mounted pin bar on its rear face, as shown in FIG. 4B, which may be used to secure the head-wrap or turban around the blind person's head. It should be understood, however, that other suitable fasteners, e.g., hook-and-loop fasteners, snaps, may be used instead of a pin. Also, although a headband is shown, it should be understood that a hat may be used instead of a headband, and the multiple sensors and auditory device of the headband may be secured within the hat or on an exterior surface thereof as described for the headband.

FIG. 5 depicts an exemplary central control device/wristband 58 of the multisensor system 5 for the blind. The central control device/wristband 58 may have a housing 56 that is accommodated on the wristband 58, as shown, for enclosing electronic components and for mounting a user interface. As discussed previously, the central control device/wristband 58 may include a microcontroller 60, a first receiver 62 adapted for receiving signals from the cane 30, a second receiver 64 adapted for receiving signals from the boot 38, and a third receiver 66 adapted for receiving signals from the headband 46. The first receiver 62 may be further configured to determine whether signals are being emitted from the front sensor 32 or the rear sensor 34 of the cane 30 using, e.g., distinguishing pin numbers and/or barcodes. Similarly, the second receiver 64 may be further configured to determine whether signals are being emitted from the front sensor 32 or rear sensor 34 of the boot 38 using, e.g., distinguishing pin numbers and/or barcodes. A central auditory device 82 may also be disposed in the housing. One or more switches or buttons may activate the multisensory system. For example, the cane 30, the boot 38, and the headband 46 may each be activated by corresponding switches 68, 70, and 72, respectively, on the wristband. The ON/OFF indicia for the switches may be indicated in Braille. A search button 73 may activate a tracking device in the central control device/wristband 58 to help the user locate the cane, the boot, and/or the headband if one or all of the accessories are misplaced.

Once the central control device/wristband 58 receives signals from the first receiver 62, the second receiver 64, and the third receiver 66, the signals may be interpreted and processed by the microcontroller 60. An auditory signal may then be emitted from the central control device/wristband 58 to activate the central auditory device 82. As discussed previously, auditory device 36, auditory device 44, and/or auditory device 52, may also be activated, depending on the elevation of the obstruction. For example, if the obstruction is at ground level, the central auditory device 82 as well as the auditory device 36 associated with the cane 30 will both be activated. Once activated, the central auditory device 82 and the cane 30 may emit a beeping sound or speech output to indicate the presence and/or distance of the obstruction.

It is to be understood that the present invention is not limited to the embodiments described above, but encompasses any and all embodiments within the scope of the following claims.

I claim:

1. A multisensor system for the blind, comprising:
a cane including an auditory device and at least one cane sensor, the at least one cane sensor being a proximity sensor configured for detecting obstructions in the path of a user at about ground level,
a boot including an auditory device and at least one boot sensor, the at least one boot sensor being a proximity sensor configured for detecting obstructions in the path of a user at about shin level,
a headband including an auditory device and at least one headband sensor, the at least one headband sensor being a proximity sensor configured for detecting obstructions in the path of a user at about head level, and
a wristband including a central control device, the central control device including a microcontroller, an auditory device, a first receiver configured to receive signals from the at least one cane sensor, a second receiver configured to receive signals from the at least one boot sensor, and a third receiver configured to receive signals from the at least one headband sensor.

2. The multisensor system for the blind according to claim 1, wherein the at least one cane sensor, the at least one boot sensor, and the at least one headband sensor are ultrasonic sensors.

3. The multisensor system for the blind according to claim 2, wherein the ultrasonic sensors are ultrasonic nano-sensors.

4. The multisensor system for the blind according to claim 1, wherein the at least one cane sensor comprises a front sensor and a rear sensor, and the at least one boot sensor comprises a front sensor and a rear sensor.

5. The multisensor system for the blind according to claim 1, wherein the at least one cane sensor, the at least one boot sensor, and the at least one headband sensor each include a microprocessor and a transmitter.

6. The multisensor system for the blind according to claim 1, wherein said headband further comprises a headband pin, the headband sensors and the auditory device of the headband being housed in the pin, the headband pin securing said headband wrapped around the blind user's head.

7. The multisensor system for the blind according to claim 6, wherein said headband pin includes a pin assembly having a clasp and pivotally mounted pin bar disposed on a rear surface of said headband pin.

8. The multisensor system for the blind according to claim 1, wherein the central control device further comprises a tracking device to locate the cane, the boot, and the headband.

9. A multisensor system for the blind, comprising:
a cane having:
a transducer configured to emit an audible alert mounted in the cane;
at least one ultrasonic proximity sensor mounted in the cane for detecting obstructions in the path of a user at about ground level;
a first microcontroller mounted in the cane; and
a transmitter mounted in the cane, the transducer, the at least one ultrasonic proximity sensor, and the transmitter being connected to the first microcontroller;
a boot having:
a transducer configured to emit an audible alert mounted in the boot;
at least one ultrasonic proximity sensor mounted in the boot for detecting obstructions in the path of a user at about shin level;
a second microcontroller mounted in the boot; and
a transmitter mounted in the boot, the transducer, the at least one ultrasonic proximity sensor, and the transmitter being connected to the second microcontroller;
a headband having:
a transducer configured to emit an audible alert mounted in the headband;
at least one ultrasonic proximity sensor mounted in the headband for detecting obstructions in the path of a user at about head level;
a third microcontroller mounted in the headband; and
a transmitter mounted in the headband, the transducer, the at least one ultrasonic proximity sensor, and the transmitter being connected to the third microcontroller; and
a wristband having a central control device mounted thereon, the central control device including:
a fourth microcontroller;
a transducer configured to emit an audible alert mounted in the central control device;
a first receiver configured to receive signals from the transmitter mounted in the cane;
a second receiver configured to receive signals from the transmitter mounted in the boot;
a third receiver configured to receive signals from the transmitter mounted in the headband, the transducer, the first receiver, the second transceiver, and the third transceiver being connected to the fourth microcontroller; and
a plurality of user interface controls connected to the fourth microcontroller, the user interface controls being configured to selectively turn on and off the at least one ultrasonic proximity sensor in the cane, in the boot, and in the headband.

10. A method for detecting obstructions in the path of a blind user comprising:
detecting obstructions in the path of the user at about ground level using a cane, the cane including an auditory device and at least one cane sensor;
detecting obstructions in the path of the user at about shin level using a boot including an auditory device and at least one boot sensor;
detecting obstructions in the path of the user at about head level using a headband including an auditory device and at least one headband sensor;
using a central control device to interpret signals transmitted by the at least one cane sensor, the at least one boot sensor, and the at least one headband sensor;
activating an auditory device of the central control device and one of the auditory devices of the cane, the boot, and the headband based on the signals interpreted by the central control device.

* * * * *